United States Patent
Chen et al.

(10) Patent No.: US 9,985,441 B2
(45) Date of Patent: May 29, 2018

(54) ELECTRONIC DEVICE AND BOTTOM TYPE SELF-DRIVEN BRIDGELESS RECTIFIER

(71) Applicant: CLOUD NETWORK TECHNOLOGY SINGAPORE PTE. LTD., Singapore (SG)

(72) Inventors: Che-Hsun Chen, New Taipei (TW); Yu-Ching Chien, New Taipei (TW); Chuang-Wei Tseng, New Taipei (TW)

(73) Assignee: Cloud Network Technology Singapore Pte. Ltd., Singapore (SG)

( * ) Notice: Subject to any disclaimer, the term of this patent is extended or adjusted under 35 U.S.C. 154(b) by 292 days.

(21) Appl. No.: 14/806,136

(22) Filed: Jul. 22, 2015

(65) Prior Publication Data

US 2017/0025864 A1 Jan. 26, 2017

(51) Int. Cl.
*H02J 5/00* (2016.01)
*H02M 7/217* (2006.01)
*H02M 7/06* (2006.01)
*H02J 7/02* (2016.01)
*H02J 17/00* (2006.01)

(52) U.S. Cl.
CPC .............. *H02J 5/005* (2013.01); *H02J 7/025* (2013.01); *H02J 17/00* (2013.01); *H02M 7/06* (2013.01); *H02M 7/217* (2013.01)

(58) Field of Classification Search
None
See application file for complete search history.

(56) References Cited

U.S. PATENT DOCUMENTS

| | | | | |
|---|---|---|---|---|
| 6,038,148 A * | 3/2000 | Farrington | ............. | H02M 1/38 363/127 |
| 7,548,436 B1 * | 6/2009 | Chen | ............. | H02M 1/08 363/21.04 |
| 2005/0205679 A1 * | 9/2005 | Alihodzic | .......... | G06K 19/0701 235/492 |
| 2006/0237968 A1 * | 10/2006 | Chandrasekaran | . | H02M 7/2176 290/1 R |
| 2007/0247122 A1 * | 10/2007 | Huang | ............. | G05F 1/70 323/222 |
| 2008/0316775 A1 * | 12/2008 | Tsai | ............. | H02M 3/335 363/21.01 |
| 2014/0063880 A1 * | 3/2014 | Tseng | ............. | H02M 1/4216 363/89 |
| 2014/0177305 A1 * | 6/2014 | Irish | ............. | H02M 7/217 363/127 |

* cited by examiner

*Primary Examiner* — Jared Fureman
*Assistant Examiner* — James Evans
(74) *Attorney, Agent, or Firm* — ScienBiziP, P.C.

(57) ABSTRACT

A rectifier includes a first diode, a second diode, a first switch and a second switch. Each of the first switch and the second switch includes a controlling pole, a first connecting pole and a second connecting pole. A positive pole of the first diode, the second connecting pole of the first switch, and the controlling pole of the second switch are coupled to a first pole of an alternating current (AC) power. A positive pole of the second diode, the second connecting pole of the second switch, and the controlling pole of the first switch are coupled to a second pole of the AC power. A negative pole of the first diode and a negative pole of the second pole are coupled to an output pole, and the first connecting pole of the first switch and the first connecting pole of the second switch are grounded.

14 Claims, 7 Drawing Sheets

US 9,985,441 B2

ELECTRONIC DEVICE AND BOTTOM TYPE SELF-DRIVEN BRIDGELESS RECTIFIER

FIELD

The subject matter herein generally relates to an electronic device and a bottom type self-driven bridgeless rectifier with efficiency for wireless charging.

BACKGROUND

Wireless charging uses an electromagnetic field to transfer power between two objects. This is usually done with a charging station. Power is sent through an inductive coupling to an electrical device, which can then use that energy to charge batteries or run the device.

BRIEF DESCRIPTION OF THE DRAWINGS

Implementations of the present technology will now be described, by way of example only, with reference to the attached figures.

DETAILED DESCRIPTION

Figure 1:
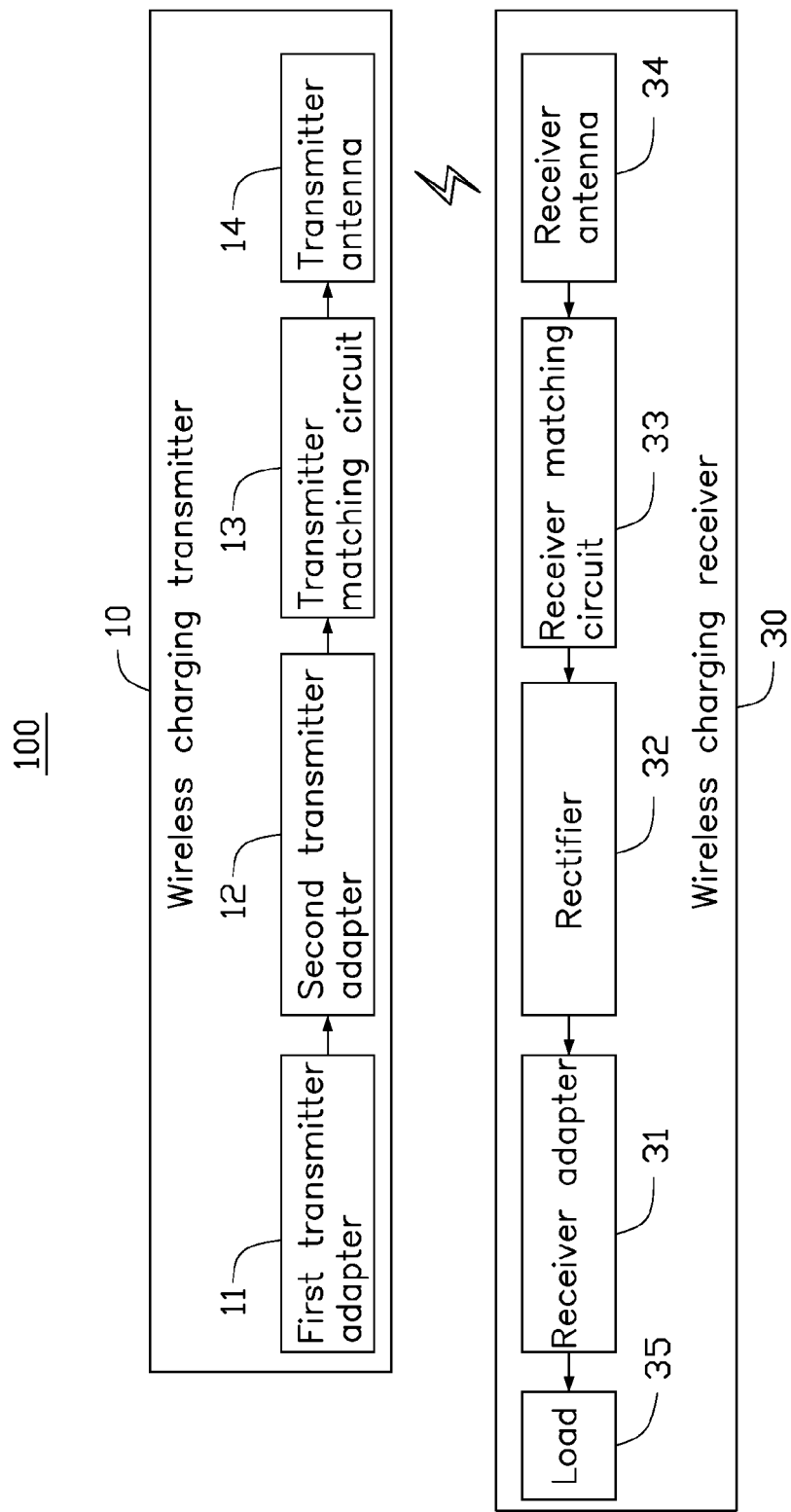
FIG. 1 is a block diagram of an electronic device in one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 illustrates a block diagram of an electronic device in one embodiment. The electronic device 100 includes a wireless charging transmitter 10 and a wireless charging receiver 30. The wireless charging transmitter 10 includes a first transmitter adapter 11, a second transmitter adapter 12, a transmitter matching circuit 13, and a transmitter antenna 14. The wireless charging receiver 30 includes a receiver adapter 31, a rectifier 32, a receiver matching circuit 33, and a receiver antenna 34. The electronic device 100 can be a laptop computer, a tablet computer, a smart phone, or a wearable device.

The wireless charging transmitter 10 can transmit power to the wireless charging receiver 30 through the transmitter antenna 13 and the receiver antenna 34. The wireless charging receiver 30 can supply the receiving power to a battery or device system. The first transmitter adapter 11 can convert a low frequency alternating current (AC) to a first direct current (DC). The second transmitter adapter 12 can convert the first DC to a high frequency AC. The transmitter matching circuit 13 can transmit the high frequency AC to the transmitter antenna 14. The transmitter matching circuit 33 can transmit the received high frequency AC from the receiver antenna 34 to the rectifier 32. The rectifier 32 can convert the received high frequency AC to a second DC. The receiver adapter 31 can convert the second DC to a third DC.

Figure 2:
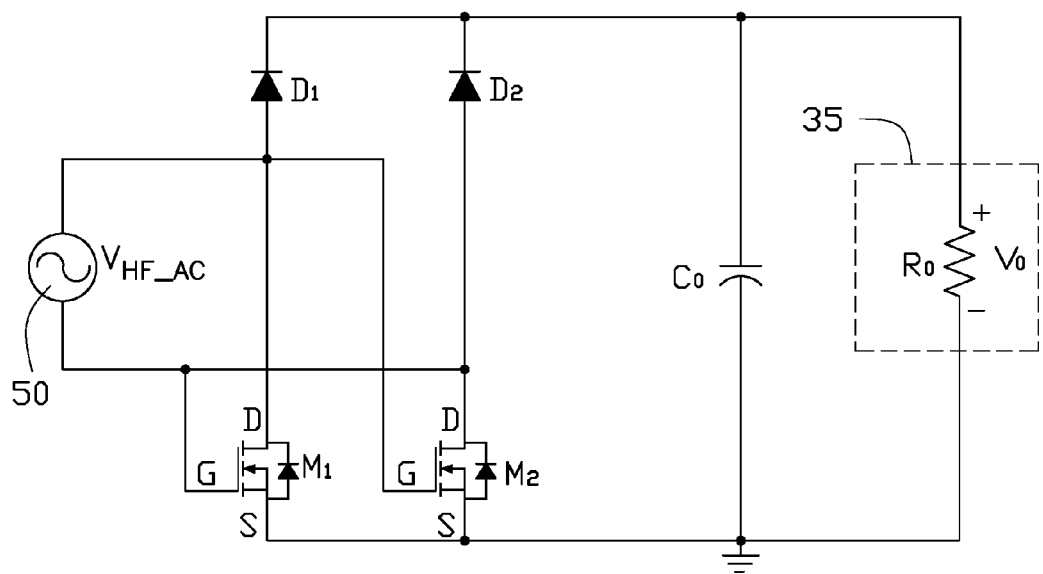
FIG. 2 is a circuit diagram view of a rectifier of the electronic device of FIG. 1.
Figure 4:
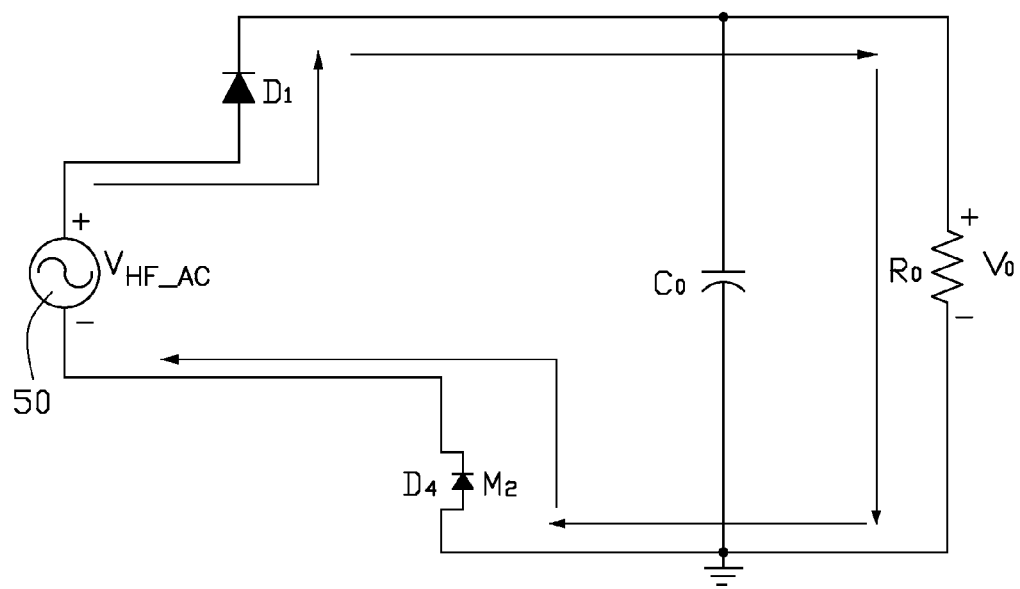
FIG. 4 is a circuit diagram of the rectifier working in a first mode.
Figure 6:
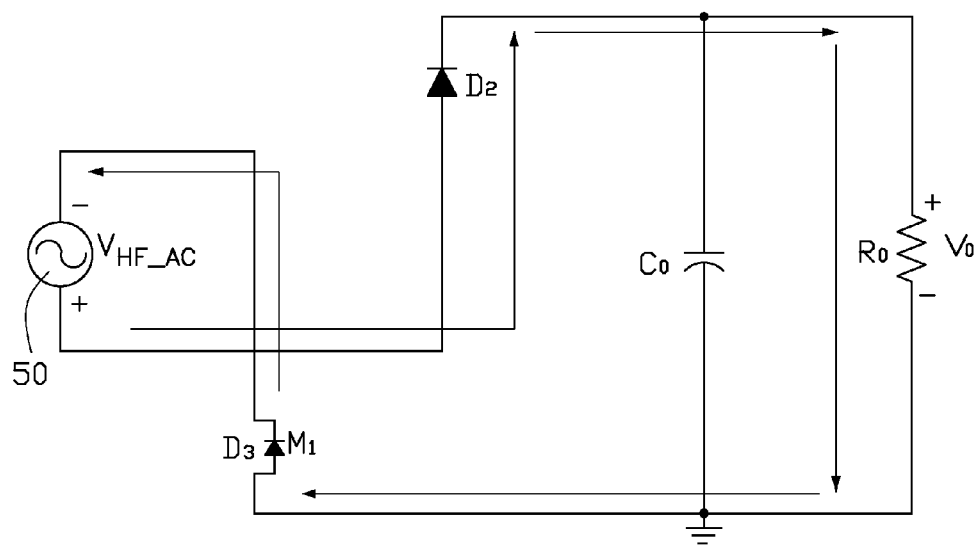
FIG. 6 is a circuit diagram of the rectifier working in a fourth mode.

FIG. 2 illustrates a circuit diagram of a rectifier in one embodiment. The rectifier can convert a high frequency AC power 50 to a DC. The rectifier includes a first diode D1, a second diode D2, a first switch M1 and a second switch M2. The first switch M1 and the second switch M2 can be two same metal oxide semiconductor field effect transistors (MOSFETS). The first switch M1 can include a first parasitic diode D3 (as shown in FIG. 6). The second switch M2 can include a second parasitic diode D4 (as shown in FIG. 4). A positive pole of the first diode D1, a drain D of the first switch M1, and a gate G of the second switch M2 are coupled to a first output pole of the high frequency AC power 50. A positive pole of the second diode D2, a drain D of the second switch M2, and a gate G of the first switch M1 are coupled to a second output pole of the high frequency AC power 50. A negative pole of the first diode D1 and a negative pole of the second diode D2 are coupled to an output resistor RO for supplying a load 35. A source S of the first switch M1, a source S of the second switch M2 and the output resistor R0 is grounded. A capacitor C0 is coupled to the negative pole of the first diode M1 and the negative pole of the second pole M2 on one side and is grounded on another side.

Figure 3:
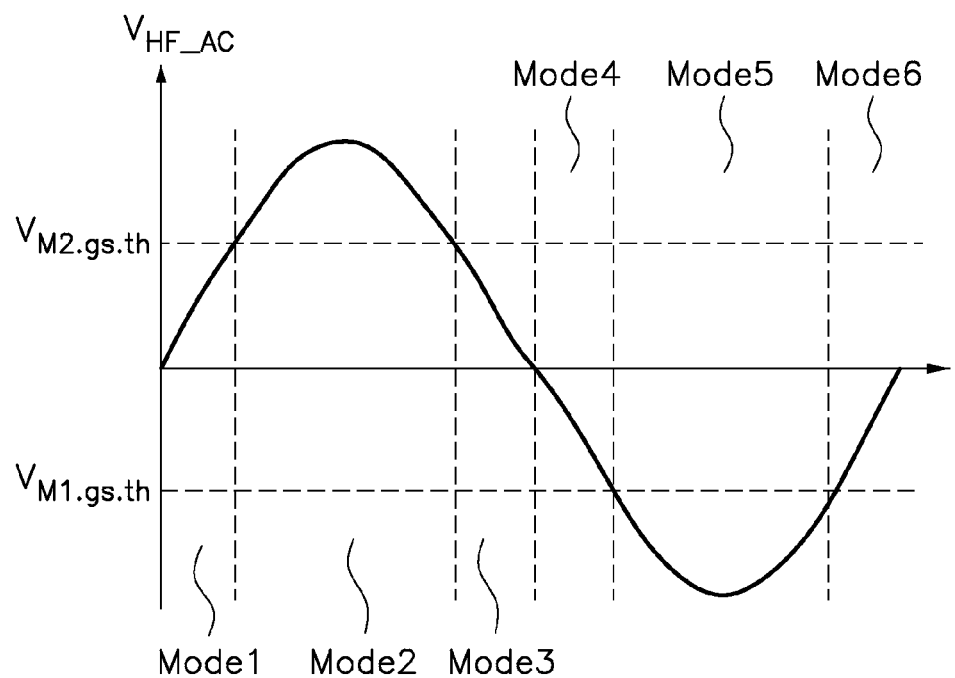
FIG. 3 is a wave diagram of an AC power coupled to the rectifier of FIG. 2.

FIG. 3 illustrates a wave diagram of an AC power. When the AC power runs in one cycle, the rectifier can work from a mode 1 to a mode 6. When the high frequency AC outputs a positive voltage from a first pole, the rectifier can work from mode 1 to mode 3. When the AC power outputs a positive voltage from a second pole, the rectifier can work from mode 4 to mode 6. A threshold voltage of the gate of the first switch M1 or the second switch M2 is defined when the first switch M1 or the second switch M2 can be changed from a switched off state to a switch on state.

FIG. 4 illustrates a circuit diagram of the rectifier working in mode 1. In mode 1, an output voltage from the first pole of the AC power 50 is lower than the threshold voltage. The first diode D1 is on. The second diode D2, the first switch M1 and the second switch M2 are switched off. However, the parasitic diode D4 of the second switch M2 is switched on. The second pole of the AC power is grounded. The resistor R0 can receive an output DC power.

Figure 5:
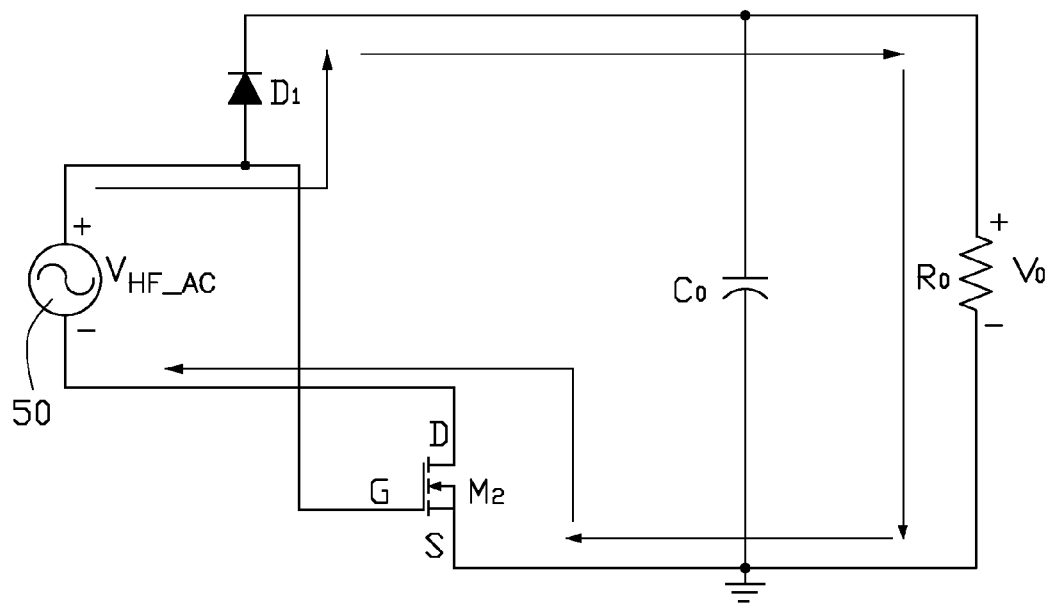
FIG. 5 is a circuit diagram of the rectifier working in a second mode.

FIG. 5 illustrates a circuit diagram of the rectifier working in mode 2. In mode 2, an output voltage from the first pole of the AC power 50 is equal to or higher than the threshold voltage. The first diode D1 and the second switch M2 are switched on. The second diode D2 and the first switch M1 are switched off. The second pole of the AC power is grounded. The resistor R0 can receive an output DC power.

In mode 3, the output voltage from the first pole of the AC power 50 becomes lower than the threshold voltage. A circuit diagram of the rectifier is the same as mode 1.

FIG. 6 illustrates a circuit diagram of the rectifier working in mode 4. In mode 4, an output voltage from the second pole of the AC power 50 is lower than the threshold voltage. The second diode D2 is on. The first diode D1, the first switch M1 and the second switch M2 are switched off. However, the parasitic diode D3 of the first switch M1 is switched on. The second pole of the AC power is grounded. The resistor R0 can receive an output DC power.

Figure 7:
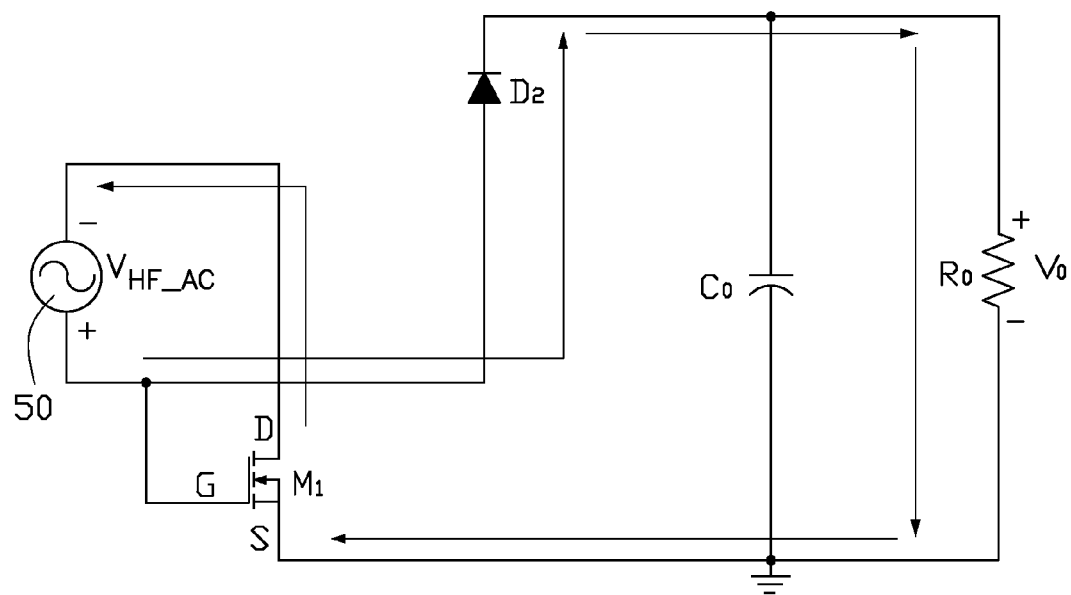
FIG. 7 is a circuit diagram of the rectifier working in a fifth mode.

FIG. 7 illustrates a circuit diagram of the rectifier working in mode 5. In mode 5, an output voltage from the second pole of the AC power 50 is equal to or higher than the threshold voltage. The second diode D2 and the first switch M1 are switched on. The first diode D1 and the second switch M2 are switched off. The first pole of the AC power is grounded. The resistor RO can receive an output DC power.

In mode 6, the output voltage from the second pole of the AC power 50 becomes lower than the threshold voltage. A circuit diagram of the rectifier is the same as mode 4.

The embodiments shown and described above are only examples. Many details are often found in the art such as the other features of a fan detecting device and an electronic device and a bottom type self-driven bridgeless rectifier. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size and arrangement of the parts within the principles of the present disclosure up to, and including, the full extent established by the broad general meaning of the terms used in the claims. It will therefore be appreciated that the embodiments described above may be modified within the scope of the claims.

What is claimed is:

1. A rectifier comprising:
   a first diode having a positive pole configured to be coupled to a first pole of an alternating current (AC) power source and a negative pole configured to be coupled to an output pole;
   a second diode having a positive pole configured to be coupled to a second pole of the AC power and a negative pole configured to be coupled to the output pole;
   a first switch comprising a controlling pole configured to be directly coupled to the second pole of the AC power, a first connecting pole being grounded and a second connecting pole configured to be coupled to the first pole of the AC power; and
   a second switch comprising a controlling pole configured to be directly coupled to the first pole of the AC power, a first connecting pole being grounded, and a second connecting pole being configured to be coupled to the second pole of the AC power;
   wherein the first switch comprises a first parasitic diode, when the second connecting pole of the first switch receives a first AC voltage from the first pole of the AC power that is lower than a threshold voltage, the first parasitic diode is switched on; and when the first AC voltage is higher than the threshold voltage, the first switch is switched on.

2. The rectifier of claim 1, wherein the first switch and the second switch are MOSFETs.

3. The rectifier of claim 2, wherein the controlling pole of the first switch is a gate, the first connecting pole of the first switch is a source, and the second connecting pole of the first switch is a drain.

4. The rectifier of claim 3, wherein the controlling pole of the second switch is a gate, the first connecting pole of the second switch is a source, and the second connecting pole of the second switch is a drain.

5. The rectifier of claim 1, wherein the second switch comprises a second parasitic diode, when the second connecting pole of the second switch receives a second AC voltage from the second pole of the AC power which is lower than a threshold voltage, the second parasitic diode is switched on.

6. The rectifier of claim 5, wherein when the second AC voltage is higher than the threshold voltage, the second switch is switched on.

7. The rectifier of claim 1, wherein a first pole of a capacitor is coupled to the negative pole of the first diode and the negative pole of the second diode, and the second pole of the capacitor is grounded.

8. An electronic device comprising:
   a wireless charging receiver configured to couple to a wireless charging transmitter, the wireless charging receiver comprising:
      an alternating current power;
      a first diode and a second diode,
      a first switch and a second switch, the first switch comprising a controlling pole, a first connecting pole and a second connecting pole; and
      a load;
   wherein a positive pole of the first diode, the second connecting pole of the first switch, and the controlling pole of the second switch are directly coupled to a first pole of the alternating current (AC) power; a positive pole of the second diode, the second connecting pole of the second switch, and the controlling pole of the first switch are directly coupled to a second pole of the AC power; a negative pole of the first diode and a negative pole of the second pole are coupled to an output pole for supplying the load, and the first connecting pole of the first switch and the first connecting pole of the second switch are grounded; and
   wherein the first switch comprises a first parasitic diode, when the second connecting pole of the first switch receives a first AC voltage from the first pole of the AC power that is lower than a threshold voltage, the first parasitic diode is switched on; and when the first AC voltage is higher than the threshold voltage, the first switch is switched on.

9. The electronic device of claim 8, wherein the first switch and the second switch are MOSFETs.

10. The electronic device of claim 9, wherein the controlling pole of the first switch is a gate, the first connecting pole of the first switch is a source, and the second connecting pole of the first switch is a drain.

11. The electronic device of claim 10, wherein the controlling pole of the second switch is a gate, the first connecting pole of the second switch is a source, and the second connecting pole of the second switch is a drain.

12. The electronic device of claim 8, wherein the second switch comprises a second parasitic diode, when the second connecting pole of the second switch receives a second AC voltage from the second pole of the AC power which is lower than a threshold voltage, the second parasitic diode is switched on.

13. The electronic device of claim 12, wherein when the second AC voltage is higher than the threshold voltage, the second switch is switched on.

14. The electronic device of claim 8, wherein a first pole of a capacitor is coupled to the negative pole of the first diode and the negative pole of the second diode, and a second pole of the capacitor is grounded.

\* \* \* \* \*